United States Patent Office 2,818,445
Patented Dec. 31, 1957

2,818,445

PROCESS FOR CHLORINATING 4,5,6,7,8,8-HEXACHLORO-3a,4,7,7a-TETRAHYDRO-4,7-METHANOINDENE TO FORM THE CORRESPONDING 1,2-OCTACHLORO-METHANOINDANE

Henry Bluestone, Yuji Alexis Tajima, and Rex Everett Lidov, Denver, Colo., assignors, by mesne assignments, to Shell Development Company, Emeryville, Calif., a corporation of Delaware No Drawing. Application December 3, 1949
Serial No. 131,061

2 Claims. (Cl. 260—648)

This invention relates to new compositions of matter possessing unexpectedly high toxicity to insect life.

More specifically, this invention relates to a new halogenated hydrocarbon possessing unexpectedly high insecticidal activity and it also relates to the methods of producing this new composition.

One object of this invention is to produce organic materials possessing a high order of insecticidal activity.

Another object of this invention is the production of a new insecticidally active organic compound for which the ratio of insecticidal toxicity to mammalian toxicity is relatively high.

A further object of this invention is to provide means for producing this new insecticidally active organic material both easily and economically.

Other objects, features, capabilities and advantages are comprehended by the invention, as will later appear and as are inherently possessed thereby.

It has been known for some time that when the Diels-Alder addition compound resulting when one mole of hexachlorocyclopentadiene is caused to react with one mole of cyclopentadiene is chlorinated a new substance possessing a remarkable degree of insecticidal activity is formed. The substance so obtained, now known as chlordane, is a light colored viscous liquid; it was disclosed and claimed in the U. S. Patent No. 2,519,190 of Julius Hyman, issued August 15, 1950. The liquid composition obtained by the procedures described in the cited application has the empirical formula $C_{10}H_6Cl_8$. Chlordane would therefore appear to be the product obtained when one mole of chlorine is added to the aforementioned Diels-Alder adduct.

As studies of the chlorination reaction of the Diels-Alder adduct of hexachlorocyclopentadiene with an equal molar amount of cyclopentadiene (this adduct will hence forth be referred to as HCA) were continued it was learned that under some conditions a crystalline substance melting between 103-105° C. when pure and having the empirical formula $C_{10}H_6Cl_8$ could be obtained. This crystalline substance was found to have an insecticidal toxicity only about half that of the liquid material previously described.

Continuing investigations of the liquid $C_{10}H_6Cl_8$ led to the significant discovery that this substance was not a single pure material but was instead a mixture of closely related compounds. These closely related compounds could be separated chromatographically and as a result there were obtained three pure crystalline compounds having the formulae $C_{10}H_5Cl_7$, $C_{10}H_6Cl_8$, and $C_{10}H_5Cl_9$ respectively. The $C_{10}H_6Cl_8$ compound thus obtained was found to be identical with the crystalline $C_{10}H_6Cl_8$ melting between 103° and 105° C. hereinabove described. These facts are disclosed and the compound $C_{10}H_5Cl_7$ is claimed in the copending application of Julius Hyman, Serial Number 736,419, filed March 21, 1947. Since the insecticidal activity of the compound $C_{10}H_5Cl_7$ (now known as hepta-chlor) is approximately four times that of the liquid having the average composition $C_{10}H_6Cl_8$ the much higher activity of this liquid as compared with the crystalline $C_{10}H_6Cl_8$ was adequately accounted for.

Since the time of the original disclosure of the hereinabove recited facts we have chlorinated the adduct HCA many times under a variety of conditions and in a variety of solvents. This procedure, when neither a deficiency nor an excess of chlorine was used, has led to the normally expected product, that is, either the active liquid $C_{10}H_6Cl_8$ mixture or the less active crystalline $C_{10}H_6Cl_8$.

Altogether unexpectedly, we have now discovered that simple modifications in the procedure used for the chlorination of the adduct HCA lead to the formation of a new crystalline compound also having the empirical formula $C_{10}H_6Cl_8$, which exhibits insecticidal activity approximately four times as great as that of the crystalline $C_{10}H_6Cl_8$ compound hitherto known.

Our new highly insecticidally active crystalline $C_{10}H_6Cl_8$ and the older less active $C_{10}H_6Cl_8$ are believed to be stereoisomers with structures represented by the systematic name 1,2,4,5,6,7,8,8-octa-chloro-3a,4,7,7a-tetrahydro-4,7-methanoindane. Both, therefore, are octachlorodicyclopentadienedihydrides and will henceforth be referred to as ODD's. In order further to distinguish our new ODD isomer from the one previously known the active isomer will be referred to as beta ODD (written, b-ODD); in contrast, the previously known isomer will be referred to as the alpha ODD (written, a-ODD).

The new compound b-ODD differs from the older a-ODD in a number of physical and chemical properties. Thus while a-ODD melts when pure between 103–105° C. the newer b-ODD melts when pure between 106.5–108° C. The two compounds also differ markedly in the manner in which they react with alcoholic alkali; thus a-ODD when treated with alcoholic alkali loses approximately two gram atoms of chlorine per mole of ODD of compound treated; on the other hand, the beta compound similarly treated loses exactly one gram atom of chlorine per mole of b-ODD treated. Insecticidally, as has already been noted, the beta isomer is approximately four times as active (using the domestic housefly as the test insect) as is the alpha isomer.

The preparation of the new b-ODD is readily accomplished by chlorinating the adduct HCA in benzene solution while maintaining the solution completely in darkness and at the reflux point of the solvent. The yield of b-ODD when its preparation is attempted in this fashion, depends to some extent on the rate at which chlorine is added to the solution of the adduct HCA; while it is not, under these circumstances, the sole product it is the major product accompanied by somewhat variable amounts of heptachlor and the a-ODD isomer. The beta isomer can be separated from the mixture thus obtained by suitable crystallization procedures using methanol as the solvent.

It should be noted that compounds like dicyclopentadiene of which both the alpha and beta ODD's are believed to be chlorinated derivatives, possess melting points which are extremely sensitive to the presence of small amounts of impurities. In view of this fact it is not surprising that it is difficult in the case of the ODD isomers to obtain samples which show maximum melting points. Many recrystallizations are therefore necessary in order to obtain samples of b-ODD which show a melting point of 106.5–108° C. (We are not in fact certain that this is the maximum melting point for absolutely pure b-ODD. It is possible that further recrystallization would serve to raise even this value somewhat.) However samples with melting points this high and even samples with melting points some degrees lower show maximum insecticidal activity.

Since the usefulness of b-ODD lies essentially in its greatly enhanced insecticidal activity a more accessible criterion for adequate purity than its difficultly obtainable maximum melting point is desirable. This is particularly the case since, as is usual with compounds which possess relatively high solubilities in organic solvents, multiple crystallizations necessarily lead to large losses of valuable material. We have found that a highly reliable guide to the practical purity of b–ODD can be obtained by determining quantitatively the number of gram atoms of chlorine lost per mole of compound when it is treated with alcoholic alkali.

The number of gram-atoms of chlorine lost per mole of compound as a result of the action of alcoholic alkali thereon is influenced in part by the actual procedure used for determining this quantity. Consequently, in order for the value thus obtained to have significance it is necessary to fix conditions for the test. We employ the procedure outlined hereinafter and all of the values herein cited for this quantity have been obtained by using it.

*Procedure.*—An approximately 0.1 g. sample of the compound under test is weighed into a 200 ml. Erlenmeyer flask and there is added thereto approximately 20 ml. of a 0.5 N solution of potassium hydroxide in isopropanol (100%). The flask is fitted with a water cooled condenser and the solution is boiled under reflux for one hour, counting time accurately from the beginning of actual boiling. At the end of one hour the solution is acidified with approximately 10 ml. of 3.0 N nitric acid, one or two ml. of a saturated ferric nitrate solution (as an indicator) and an excess of standardized silver nitrate (0.03 N) solution (volume added accurately measured) are added. The solution is cooled in an ice water bath for fifteen minutes and the excess silver ion is back-titrated with a standardized solution of potassium thiosulfate (0.03 N). In the event that the solution is very dark 10 ml. of nitrobenzene is added to the flask and the contents are shaken vigorously before beginning the back titration.

In general, it appears that samples of b–ODD which when treated with alcoholic alkali lose not more than 1.1 gram atoms of chlorine per mole of compound treated are adequately pure for almost all insecticidal uses. Without entering, at this point, into a discussion of the many interesting properties which b–ODD possesses as an insect toxicant it should, however, be noted that samples of this material which are to be used to combat the bean beetle should have a purity such that one mole of compound treated with alcoholic alkali loses not more than an average of 1.05 gram atoms of chlorine.

While, as has already been noted, major yields of the new b–ODD can be obtained by chlorinating the adduct HCA in benzene solution in the dark at the reflux temperature of the solvent the material thus prepared can not readily be isolated in pure form. Since the various chlorination products of the adduct HCA are all readily soluble in organic solvents and in each other, the separation of one of these products by crystallization procedures when others of them are present in appreciable quantities is difficult, if not impossible. It is, therefore, indeed fortunate that we have been able to discover chlorination procedures which serve further to increase the conversion of the adduct HCA to the desired b–ODD at the expense of the other possible chlorination products.

Thus, for example, the addition of approximately one percent of carbon black (based on the weight of the adduct treated) to the benzene solution of the adduct HCA causes a sufficient increase in the yield of the compound b–ODD obtained to allow its separation, in relatively pure form, by crystallization procedures to be accomplished economically. Substantially equally satisfactory results have been obtained by employing a variety of different types of carbon black. While the amount of carbon black employed does not appear to be highly critical we prefer in general to use a quantity between approximately 0.49 to 5.1 percent based on the weight of the adduct treated.

Another, and from the standpoint of commercial operation, a somewhat more practical method for accomplishing this same result has also been discovered. This second modification of our basic procedure consists of slowly adding a solution of the adduct HCA dissolved in benzene to a refluxing solution of benzene saturated with chlorine; additional chlorine is continuously added to the benzene solution as the adduct HCA solution is added in order to maintain the chlorine saturation of the refluxing solution. This chlorination procedure is also carried out in the dark. When the chlorination is accomplished in this manner, the overall yield of b–ODD is equal to or somewhat greater than that obtained by the chlorination in the presence of carbon-black. For convenience of reference this procedure will hereinafter be referred to as the "reverse addition" procedure.

The two procedures hereinabove described can be combined in order to obtain a maximum yield of the desired b–ODD isomer. This combination is accomplished by adding carbon black to the refluxing chlorine saturated solution of benzene to which the benzene solution of the adduct HCA is subsequently slowly added while maintaining chlorine saturation by the continuous addition of gaseous chlorine. The formation of the new compound b–ODD is but little effected by variations either in the temperature at which chlorination is conducted or by changes in the concentration of the adduct, HCA, solutions used. As a result, the material can be prepared with substantially equal facility at any point within the temperature range of 20–100° C. Similarly, the solution of the adduct HCA which is chlorinated can be varied from one which contains the adduct in concentrations of approximately forty percent by weight to solutions which are practically infinitely dilute with respect to the adduct. In that connection, it should be noted that when the chlorination procedure which involves the addition of an adduct solution slowly to a benzene solution saturated with chlorine is used the concentration of the adduct in the reacting solution is at all times very low.

As has been noted, our new b–ODD can be obtained in excellent yield when the chlorination of the adduct HCA is conducted in benzene solution. Under the conditions required to produce this new compound chlorination of this solvent is inappreciable and the benzene is easily and economically recovered. However, other solvents can be used in which the chlorination product obtained is the new b–ODD; among others, mono-chlorobenzene, dichlorobenzene, chloroform and the nitroparaffines may be listed.

The examples which follow more specifically illustrate the methods which can be employed in preparing the new compound b–ODD. These examples, of course, are for illustrative purposes only and are not in any sense to be taken as limiting the scope of our invention.

Example I illustrates the preparation of the starting material HCA.

EXAMPLE I

To 64.5 grams of hexachlorocyclopentadiene was added 17.5 grams of cyclopentadiene and the mixture was mechanically stirred in a closed glass vessel fitted with an efficient reflux condenser and a thermometer. The reaction is exothermic and the reacting mixture was cooled when its temperature reached 100° C. After the initial exothermic reaction subsided, the reaction mixture was permitted to stand at room temperature until solidification was complete. The solid was then transferred to a suction funnel and dried by drawing air through it. There was thus obtained 79.9 grams of a white powdery solid of good quality. This material was further purified by recrystallization from ethanol. The recrystallized compound was obtained as a white crystalline solid melting between about 170° and about 180° C.

Example II illustrates one method of preparing our new b–ODD by the direct chlorination of the adduct HCA.

EXAMPLE II

A one liter three necked flask was fitted with a reflux condenser, a motor driven stirrer, and a sintered glass inlet tube. The apparatus set-up thus obtained was then carefully covered with an opaque black paint and with black friction tape in order to exclude the entrance of all light. Particular attention was given to the edges of the tubular glass apparatus placed in the necks of the flask in order to preclude the entrance of light by transmission lengthwise through such apparatus. Into the apparatus thus prepared was added a solution containing 101.7 grams (0.3 mole) of the adduct HCA dissolved in approximately 500 cc. of benzene. This solution was heated to and maintained at reflux and chlorine was then introduced through the gas inlet tube until chlorination of the adduct was complete. (The chlorination is considered completed when a sample withdrawn from the reaction flask no longer reacts with bromine. In order to test for completion a sample is withdrawn and stripped of the benzene solvent; the residue is taken up in carbon tetrachloride and the solution thus obtained reacted with a solution of bromine in carbon tetrachloride under direct radiation from an ultra-violet light source or from a 250 watt incandescent bulb.) After the completion of chlorination the material was withdrawn from the chlorination flask and completely stripped of the benzene solvent. The residue thus obtained was an almost colorless extremely viscous syrup. This syrup was taken up in methanol and treated in boiling methanol solution with a decolorizing charcoal. The charcoal was separated by filtration and the resulting solution was strongly chilled. By this means a small quantity of crystals was obtained melting in the range between 100–104° C. This solid was recrystallized many times from alcohol until finally it showed a melting point of 106.5–108° C.

*Analysis.*—Calculated for $C_{10}H_6Cl_8$: C, 29.31; H, 1.48; Cl, 69.22. Found: C, 29.36; H, 1.59; Cl, 68.99.

The procedure utilizing carbon black to increase the yield of the desired b–ODD is illustrated by Example III.

EXAMPLE III

To a solution of 200 grams of the adduct HCA dissolved in 500 ml. of benzene there was added 2.0 grams of carbon black. This solution was then chlorinated utilizing the apparatus described in Example II above. After chlorination was complete the carbon black was separated on a filter and the resulting solution was stripped of the benzene solvent. The residue thus obtained was an almost colorless viscous liquid which, on standing, solidified almost completely. This crude solid was dissolved in methanol and at the boiling point of methanol was treated with a decolorizing charcoal which was then separated on a filter; on cooling, the methanol solution thus obtained deposited 145.7 grams of crystalline solid which was separated on a filter. The b–ODD prepared in this manner melted between 97° and 101° C. and lost, on treatment with alcoholic alkali, as previously described, an average of 1.18 gram atoms of chlorine per mole of compound treated.

Example IV illustrates another modification of our basic procedure used for the preparation of b–ODD. This is the "reverse addition" procedure.

EXAMPLE IV

A 5 liter three necked flask was fitted with a reflux condenser, an electrically operated stirrer, a sintered glass gas inlet tube and a dropping funnel. The apparatus set-up thus obtained, with the exception of the bulb of the dropping funnel, was then carefully covered with an opaque black paint and with black friction tape in order to exclude the entrance of all light. Particular attention was given to the edges of the tubular glass apparatus placed in the necks of the flask in order to preclude the entrance of light by transmission lengthwise through such apparatus and the placement of the dropping funnel was so arranged as completely to avoid entrance of light into the apparatus therethrough. A benzene solution of the adduct HCA (1500 grams of adduct in one liter of benzene) was placed in the dropping funnel and two liters of benzene were placed in the blackened flask. The benzene in the flask was brought to and maintained at reflux and chlorine was introduced through the gas inlet tube to saturate the boiling benzene. After saturation had been accomplished and without interrupting the flow of gaseous chlorine the dropwise addition of the adduct solution in the dropping funnel was begun and continued at such a rate as to cause addition to be complete in approximately eight hours. Introduction of chlorine was discontinued one-half an hour after the last of the benzene adduct solution had entered the flask. The reaction solution was withdrawn from the chlorination flask and completely stripped of the benzene solvent. The residue thus obtained was an almost colorless viscous liquid which, on standing, solidified almost completely. This crude solid was dissolved in methanol and at the boiling point of methanol was treated with a decolorizing charcoal which was then separated on a filter; on cooling, the methanol solution thus obtained deposited 1335 grams of crystalline solid which was separated on a filter. These crystals melted between 94° C. and 101° C. and lost, on treatment with alcoholic alkali as previously described, an average of 1.23 gram atoms of chlorine per mole of compound treated. This once recrystallized solid was again recrystallized from methanol. The second recrystallization yielded a first crop of crystals weighing 762 grams. The twice recrystallized b–ODD thus obtained melted between 104° C. and 106° C. and on treatment with alcoholic alkali showed an average loss of 1.06 gram atoms of chlorine per mole of compound treated.

The procedures illustrated by the preceding examples can, of course, be modified in many ways without unduly altering the results obtained. Thus, as might be expected, if a benzene solution of the adduct HCA is placed in a suitable light tight metal container (a nickel pressure vessel, for example), and chlorine is rapidly introduced (using suitable cooling means to avoid excessive heating of the reaction mixture) until the pressure in the container reaches 50–100 p. s. i. gage the adduct is rapidly chlorinated to give a product, substantially similar to that of Example IV, from which a large percentage of our new b–ODD can be separated. It should therefore be clearly understood that the examples herein contained are illustrative only and are not in any fashion to be taken as limiting the scope of our invention.

As has previously been indicated we believe that our new compound b-ODD is obtained as the result of the addition of one mole of chlorine to the double bond in the cyclopenteno ring of the adduct HCA. Theoretically, such an addition of chlorine to the aforementioned double bond of the adduct HCA can result in the formation of four distinct compounds which differ from each other only in the spacial arrangements of the added chlorine atoms with respect to each other and to the rest of the molecule of which they become a part. The four theoretically possible HCA-dichlorides are thus geometric or stereo isomers of which only the old a-ODD and our new b-ODD are known. No data are yet available which will permit a co-relation of the two known isomers with any of the four theoretically possible geometric configurations; hence it is impossible, at this time to assign exact three dimensional geometric structures to the two known isomers. In view of this fact our new b-ODD can be distinguished from its older isomer only in terms of its different physical, chemical and biological properties.

The new composition of matter, b-ODD, which we have discovered, is highly toxic to insect life. The high degree of insecticidal toxicity which this new compound possesses is particularly unexpected in view of the fact that its isomer, a-ODD, exhibits insecticidal activity which, in general, is only about one-quarter that of b-ODD. The usefulness of the new b-ODD is further enhanced by the fact that it is highly soluble in a wide variety of organic solvents, and can be dissolved in high concentrations in liquid aliphatic and aromatic hydrocarbons, esters, ethers, ketones and other similar solvents.

The data hereinbelow set forth illustrate the high degree of toxicity which the new compound, b-ODD, possesses. The level of insecticidal activity is denoted by a number called the Toxicity Index which may be defined as one hundred times the numerical value of the fraction which is obtained when the weight of compound undergoing test required to produce a given percentage mortality is divided into the weight of material used as a standard required to produce that same mortality. In general, therefore, the higher the toxicity index the greater the insecticidal activity of the compound. A compound equal in activity to the standard employed will have a toxicity index of 100: less active compounds have indices with numerical values below 100 and more active compounds have toxicity indices lying above 100. In the data given below comparisons are made on the basis of the quantity of material required to produce a 50% mortality.

Table I presents the results obtained when our new b-ODD is tested in comparison with chlordane and a-ODD using the common housefly (*Musca domestica*), using the Kearns modified small chamber test (Soap and Sanitary Chemicals, May 1948, page 133).

Table I

| Compound | Melting point, °C. | Alcoholic alkali treatment average gram atoms Cl lost per mole compound | Toxicity index |
|---|---|---|---|
| 1. Chlordane | | | 100 |
| 2. a-ODD | 103 –105 | 1.8–2.0 | 50 |
| 3. b-ODD of Ex. II | 106.5–108 | 1.0 | 196 |
| 4. b-ODD of Ex. III | 97 –101 | 1.18 | 194 |
| 5. b-ODD of Ex. IV | 94 –101 | 1.23 | 163 |
| 6. b-ODD of Ex. V | 104 –106 | 1.06 | 199 |

Examination of the data in Table I strikingly reveals the superiority of our new b-ODD as an insect toxicant.

The results obtained when third instar larvae of the Mexican bean beetle are used as the test insect are even more remarkable. In general, neither chlordane nor any of the other previously known pure compounds obtained by the chlorination of the adduct HCA have shown a high degree of toxicity for this insect. Our finding that the new compound b-ODD is highly toxic to this insect was therefore completely unexpected and altogether surprising. In general, our tests indicate that the Toxicity Index of b-ODD when tested using third instar larvae of the Mexican bean beetle is 100 when the standard used is the purified gamma isomer of hexachlorocyclohexane, a compound which is highly toxic to this insect pest.

The studies so far accomplished also appear to indicate that the insecticidal effectiveness of our new b-ODD drops relatively rapidly as the purity of the compound drops. Of course, the fact that the previously known chlorinated derivatives of the adduct HCA show but little effectiveness for the larvae of the Mexican bean beetle leads to a ready explanation of this phenomena. It is because of this apparent reduction in activity against the Mexican bean beetle with decrease in purity that it appears desirable for b-ODD intended for this use have a purity such that one mole of the compound treated with alcoholic alkali loses not more than an average of 1.05 gram atoms of chlorine.

Tests of the two compounds number 5 and number 6 of Table I, above, help to demonstrate this point. Both of these compounds when tested against third instar larvae of the Mexican bean beetle showed the same ultimate mortalities and hence appear to have the same Toxicity Index which, as previously noted, is 100 (standard, gamma isomer of hexachlorocyclohexane). However, examination of the treated foliage on which the larvae had been feeding revealed a striking difference between the two compounds. Larvae on plants which had been sprayed with an appropriate formulation of compound 6 stopped feeding immediately and no further damage was done to the plants by them; in contrast, larvae on plants which had been treated with an identical formulation of compound number 5, though ultimately killed in equal numbers, continued feeding on the plants for a much longer period of time.

Our new composition of matter, b-ODD, can be utilized as an insect toxicant in all the ways customary in the art. Thus it can be dissolved in the insecticide base oils normally employed (as was done to obtain the data of Table I) and the resulting solutions sprayed or otherwise employed in the usual fashion. It can also be combined with finely divided carriers to produce both wettable and non-wettable insecticidal dusts and it can be used together with emulsifying agents, with water, and with water and oil to form insecticidal emulsions. It can also be incorporated in aerosol compositions, and, in general, it can be used either as the sole insect toxicant in an insecticidal composition or in combination with other insecticides in order to obtain combination properties and other desirable characteristics. Moreover, our new compound b-ODD can be incorporated in paints and other surface coatings in order to impart insecticidal characteristics to the surface finishes, it can be incorporated into waxes and wax emulsions in order that the surfaces treated with these materials may be made insecticidal, it can be incorporated into paper and into cardboard, into inks, into plasticizers, into plastic sheets, etc. in order that desirable insecticidal characteristics can be acquired either directly by these materials or by the materials with which they are used.

It will be apparent to those skilled in the art that our new b-ODD which we have invented will have many uses other than those already enumerated. Thus, for example, it may because of its high solubility have value as a plasticizer and as a tackifier in many types of resinous and polymer compositions. This composition is also valuable as a starting compound and as an intermediate for perfumes, medicinals, fungicides and other organic compounds useful in the arts and sciences.

Moreover, modifications of the basic concept of our invention here presented will be evident to those skilled in the art. Such modifications are properly to be included within the scope of our disclosed invention which is, in no way, to be restricted by the various illustrative data hereinbefore contained but only by the claims appended hereto.

It is claimed:

1. The process for making the compound beta-1,2,4,-5,6,7,8,8 - octachloro - 3a,4,7,7a - tetrahydro - 4,7 - methanoindane, having a melting point, when pure, of about 106.5–108° C., which comprises chlorinating, with elemental chlorine, 4,5,6,7,8,8-hexachloro-3a,4,7,7a-tetrahydro-4,7-methanoindene in benzene solution, by slowly adding a benzene solution of the methanoindene compound to a continuously saturated solution of chlorine in benzene, whereby the concentration of the methanoindene compound in benzene containing elemental chlorine is at all times very low, while maintaining the chlorine-saturated benzene solution and the resulting mixture in complete darkness and at the boiling temperature of the solution and in the essential absence of any solid catalytic agent, removing the solvent benzene from the chlorinated product and separating the beta-methanoindane compound from the crude chlorinated product by fractional crystallization.

2. The process according to claim 1, wherein the said solution of the methanoindene compound contains about 1500 grams of the methanoindene compound per liter of benzene and the said solution of chlorine in benzene contains two liters of benzene per liter of benzene in the first solution.

References Cited in the file of this patent

UNITED STATES PATENTS 2,519,190   Hyman _____ Aug. 15, 1950

FOREIGN PATENTS 618,432   Great Britain _____ Feb. 22, 1949

OTHER REFERENCES

J. Am. Chem. Soc., September 1945, pp. 1591–1602.

Groggins: Unit Processes in Organic Synthesis, 2nd ed. (1947), p. 168.

Kearns et al.: J. Econ. Ent., vol 42, No. 1, February 1949, pp. 127–134.